(12) United States Patent
Gustavsson

(10) Patent No.: US 10,006,514 B2
(45) Date of Patent: *Jun. 26, 2018

(54) DAMPER

(71) Applicant: VIBRACOUSTIC FORSHEDA AB, Forsheda (SE)

(72) Inventor: Bengt-Göran Gustavsson, Bredaryd (SE)

(73) Assignee: VIBRACOUSTIC FORSHEDA AB, Forsheda (SE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/205,845

(22) Filed: Jul. 8, 2016

(65) Prior Publication Data

US 2017/0009836 A1    Jan. 12, 2017

Related U.S. Application Data

(66) Continuation of application No. 12/594,514, Substitute for application No. PCT/SE2007/000357, filed on Apr. 16, 2007, now Pat. No. 9,388,874.

(51) Int. Cl.
*F16F 1/37* (2006.01)
*F16F 7/108* (2006.01)
*F16F 1/373* (2006.01)

(52) U.S. Cl.
CPC .............. *F16F 7/108* (2013.01); *F16F 1/373* (2013.01); *F16F 2226/04* (2013.01)

(58) Field of Classification Search
CPC ............. F16F 1/373; F16F 7/108; F16F 15/08

USPC ........ 188/378, 380; 267/136, 141, 153, 269, 267/145, 140.3, 140, 139, 141.4
See application file for complete search history.

(56) References Cited

U.S. PATENT DOCUMENTS

| 2,132,840 | A | 10/1938 | Workman et al. |
| 2,538,658 | A | 1/1951 | Saurer |
| 2,951,674 | A | 9/1960 | Rice |
| 3,831,923 | A | 8/1974 | Meldrum |
| 4,267,792 | A | 5/1981 | Kimura et al. |
| 4,471,496 | A | 9/1984 | Gardner, Jr. et al. |
| 2003/0047121 | A1 | 3/2003 | Gruber |

(Continued)

FOREIGN PATENT DOCUMENTS

| DE | 88 11 934 U1 | 12/1988 | |
| DE | 4324009 C1 * | 10/1994 | ............... G01L 5/14 |

(Continued)

*Primary Examiner* — Anna M Momper
(74) *Attorney, Agent, or Firm* — Birch, Stewart, Kolasch & Birch, LLP

(57) ABSTRACT

The present disclosure relates to a frequency tuned damper having a vibration body (19) and at least one elastic element (11, 13, 15, 17) which connects the vibration body to a surface (21), the vibrations of which is to be dampened. The elastic element has a wide portion (29) and a narrow portion (31) disposed at different locations on an axis (39) which is substantially parallel with the normal of the surface. The wider portion has a cavity (41), and the wide and narrow portions are inter-connected by a transition portion (43). The part of the narrow portion that is closest to the transition portion fits inside the cavity, as seen in the direction of the axis, such that the narrow portion can be pushed at least partly into the cavity, thereby flexing the transition portion.

21 Claims, 3 Drawing Sheets

(56) References Cited

U.S. PATENT DOCUMENTS

2004/0040809 A1     3/2004   Gustavsson
2004/0232305 A1   11/2004   Monson et al.
2006/0226299 A1   10/2006   Tungl et al.

FOREIGN PATENT DOCUMENTS

| | | |
|---|---|---|
| DE | 20 2005 004 271 U1 | 8/2006 |
| EP | 1 303 710 B1 | 9/2004 |
| EP | 1 889 709 A1 | 2/2008 |
| FR | 2 750 189 A1 | 12/1997 |
| GB | 2 276 219 A | 9/1994 |
| WO | WO 01/92752 A1 | 12/2001 |

* cited by examiner

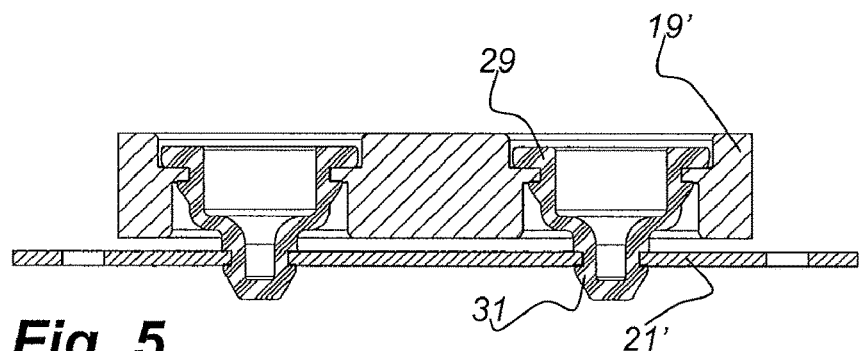
Fig. 5
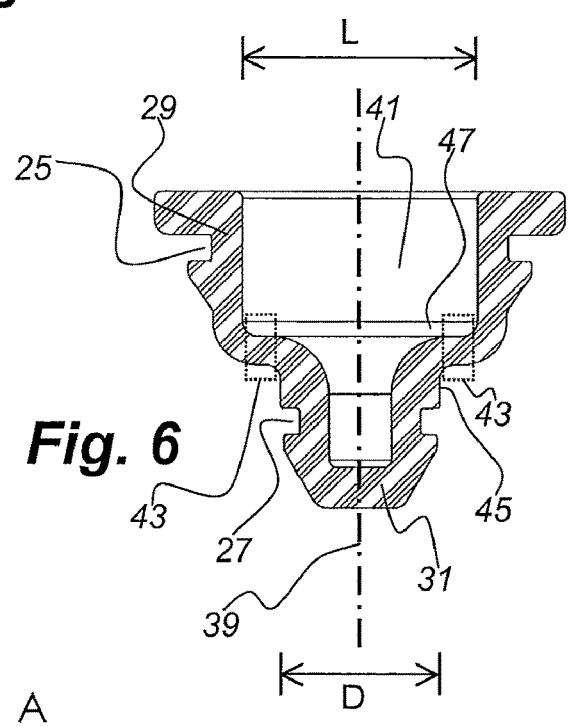
Fig. 6
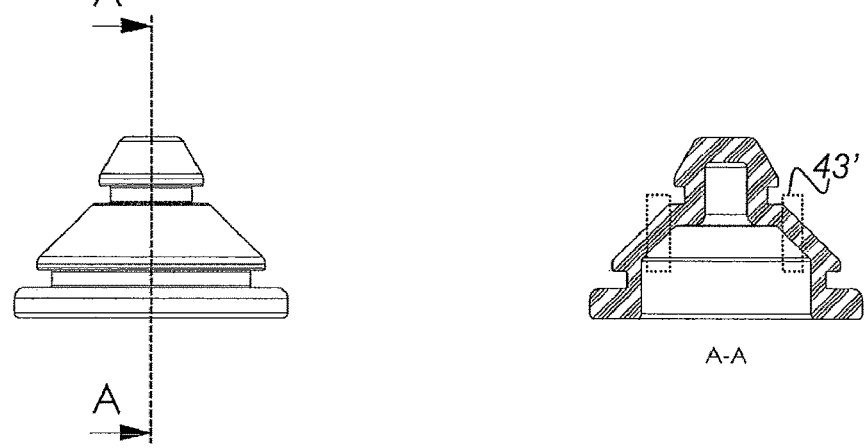
Fig. 7a  Fig. 7b

DAMPER

CROSS-REFERENCE TO RELATED APPLICATIONS

This application is a Continuation of copending U.S. application Ser. No. 12/594,514, filed on Oct. 2, 2009, which is the National Phase of PCT International Application PCT/SE2007/000357, filed on Apr. 16, 2007, all of which are hereby expressly incorporated by reference into the present application.

TECHNICAL FIELD

The present disclosure relates to a frequency tuned damper having a vibration body and at least one elastic element which is adapted to connect the vibration body to a surface, the vibrations of which is to be dampened, the elastic element having a wide portion and a narrow portion disposed at different locations along a longitudinal axis which is substantially parallel with the normal of the surface when the damper is mounted, one of said portions being adapted to attach the elastic element to the vibration body and the other to attach the elastic element to the surface, the wider portion having a cavity.

BACKGROUND

Such a damper is disclosed e.g. in EP 1303710. Dampers of this kind may be used to dampen vibrations with one or more target frequencies. For instance, the damper may be installed in the steering wheel of a vehicle, and may be used to dampen vibrations in the steering wheel corresponding to the idling rpm of the vehicle. One technical issue associated with such dampers is how to make them useful for combating vibrations of various kinds.

SUMMARY

An object of the present disclosure is to provide a frequency tuned damper that is capable of dealing with vibrations that are not addressed by the known device.

This object is achieved by the frequency tuned damper defined in claim 1.

More specifically, in a frequency tuned damper of the initially mentioned kind, the wide and narrow portions are then inter-connected by a transition portion, and the part of the narrow portion that is closest to the transition portion fits inside the cavity, at the portion thereof that is in the wide portion and closest to the transition portion, as seen in the direction of the axis, such that the narrow portion can be pushed at least partly into the cavity, thereby flexing the transition portion.

This gives the elastic element a comparatively low stiffness in the direction of the longitudinal axis, and allows the damper to dampen vibrations with relatively low frequencies in that direction.

The elastic element may be circular symmetric about the longitudinal axis. This gives the elastic element similar properties in for vibrations having their amplitude in the plane of the surface, such that the orientation of the elastic element around the element is not critical.

The transition portion may have the shape of an annular disc, centered with respect to the longitudinal axis. This is particularly useful for low frequency vibrations. Alternatively, the transition portion may have the shape of an envelope surface of the frustum of a cone, centered with respect to the longitudinal axis. This makes the elastic element suitable for dealing also with somewhat higher frequencies.

The cavity may be open in the direction of the longitudinal axis at the wide portion. This makes is possible to insert a tool in the cavity that facilitates the mounting of the frequency tuned damper. The cavity may for this purpose also extend into the narrow portion of the elastic element.

The elastic element may be made of silicone rubber, although many other elastic materials are conceivable.

The damper may comprise an intermediate member, which is adapted to connect the elastic element/elements to the vibration surface.

The elastic element may be attached to the vibration body by means of a first circumferential groove in the elastic element engaging with a circumferential projection inside a cavity of the vibration body. The elastic element may further comprise a second circumferential groove for attaching the elastic element to the vibration surface.

BRIEF DESCRIPTION OF THE DRAWINGS

FIG. 5 illustrates an alternative embodiment of a damper.

FIG. 6 illustrates an elastic element of a first type.

FIGS. 7a and 7b illustrate an elastic element of a second type.

DETAILED DESCRIPTION

Figure 1:
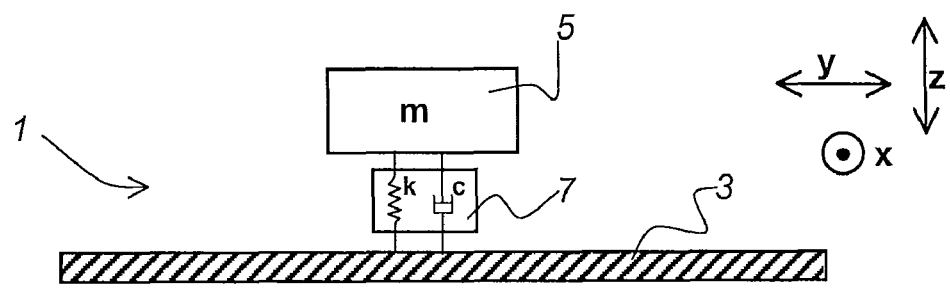
FIG. 1 illustrates schematically a frequency tuned damper.

The present invention relates in general to frequency tuned dampers. An example of such a damper 1 is schematically illustrated in FIG. 1. The damper 1 is used to dampen vibrations in a surface 3, and comprises a vibration body 5 and at least one elastic element 7, which are attached to the surface 3 and together provide a spring-mass system.

The mass m of the vibration body 5, and the stiffness k and damping c of the elastic element 7 are selected to provide a damping effect on the surface 3, which can be expected to vibrate at a predetermined target frequency. When the surface vibrates at this frequency, the vibration body is caused to oscillate at the same frequency as the surface but out of phase with the latter, such that the vibration of the surface is substantially dampened. The vibration body may vibrate with an amplitude substantially greater than the vibration amplitude of the surface. The general concept of a frequency tuned damper as illustrated in FIG. 1 is well known per se.

The following disclosure presents an elastic element for use in a frequency tuned damper, which is suitable for dealing with vibrations in up to three dimensions in a vibrating surface. As illustrated in FIG. 1 the damper may thus dampen vibrations in the x- and y dimensions (parallel with the surface 3) as well as in the z dimension (parallel with the normal of the surface 3). It should be noted that the elastic element may provide different spring characteristics (stiffness, damping) in different dimensions. Thus, the damper may be used to dampen vibrations in the surface 3 having different frequencies in different dimensions.

Figure 2:
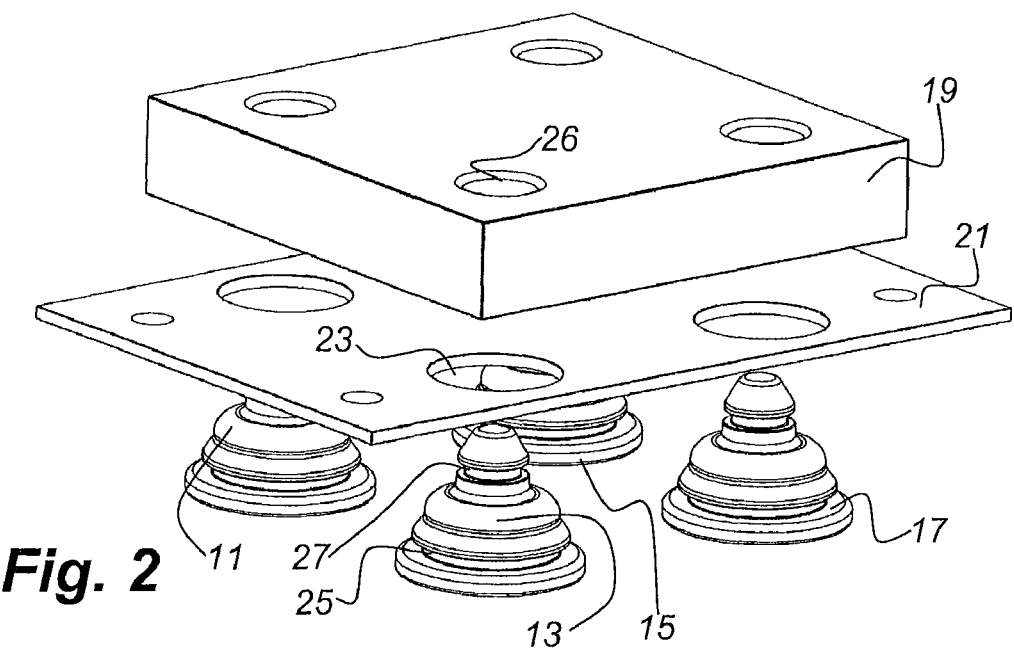
FIG. 2 shows an exploded view of a damper having four elastic elements and being attached to a vibration surface.

FIG. 2 shows an exploded view of a damper having a vibration body 19 and four elastic elements 11, 13, 15, 17, and being attached to a vibration surface 21. The vibration body may be made of a material with relatively high density, such as cast iron or the like. The elastic elements may be made of different elastic materials. Silicone rubber is one suitable example as a silicone rubber elastic element retains its stiffness and damping to a great extent even if the temperature varies.

The vibration surface 21 is not to be regarded as a part of the damper, as the purpose of the damper is to reduce vibrations in a surface already existing in a structure. However, the elastic elements may also be connected to the vibration surface via an intermediate member, which may then be regarded as a part of the damper.

In the illustrated example, the damper may be attached to the vibration surface 21 by pushing each elastic element, e.g. 13, through a corresponding opening 23 in the vibration surface until a first groove 25 in the elastic element 13 forms a grip on the rim of the opening 23. A part of the elastic element is further pushed through a corresponding opening 26 into the interior of the vibration body 19 until a second groove 27 on the elastic element 13 forms a similar grip on the vibration body 19. The elastic element will be described in greater detail below. A number of alternative ways of mounting the elastic element exists as the skilled person realizes.

Figure 3:
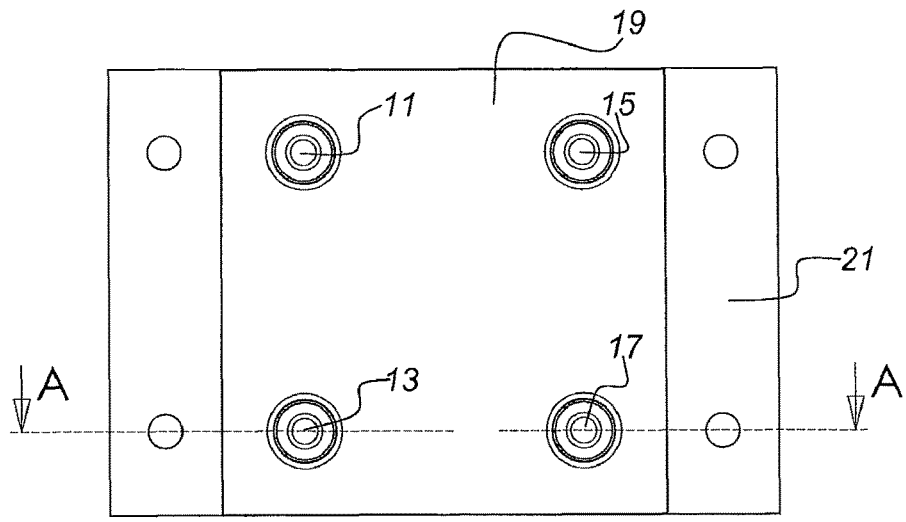
FIG. 3 shows a front view of the damper in FIG. 2.

FIG. 3 illustrates a front view of the damper in FIG. 2. As illustrated, the vibration body 19 is attached to the vibration surface 21 by means of four elastic elements 11, 13, 15, and 17, which are arranged in the corners of a rectangular formation. Needless to say, other layouts are of course conceivable as well as other numbers of elastic elements.

Figure 4A:
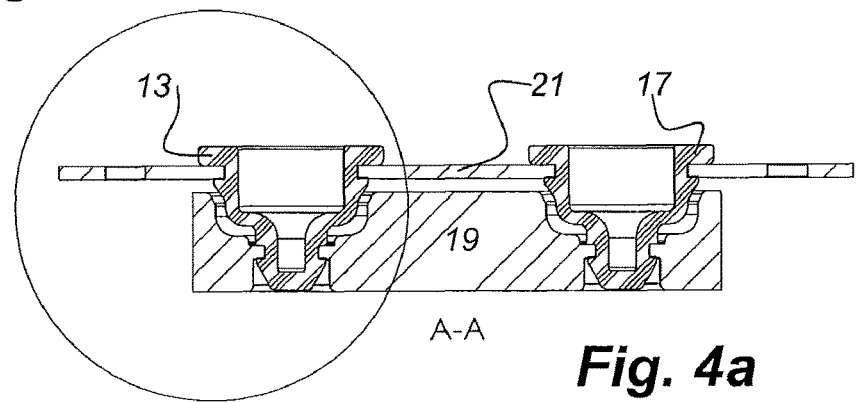
FIGS. 4a and 4b illustrate a cross-section through the damper of FIG. 3.
Figure 4B:
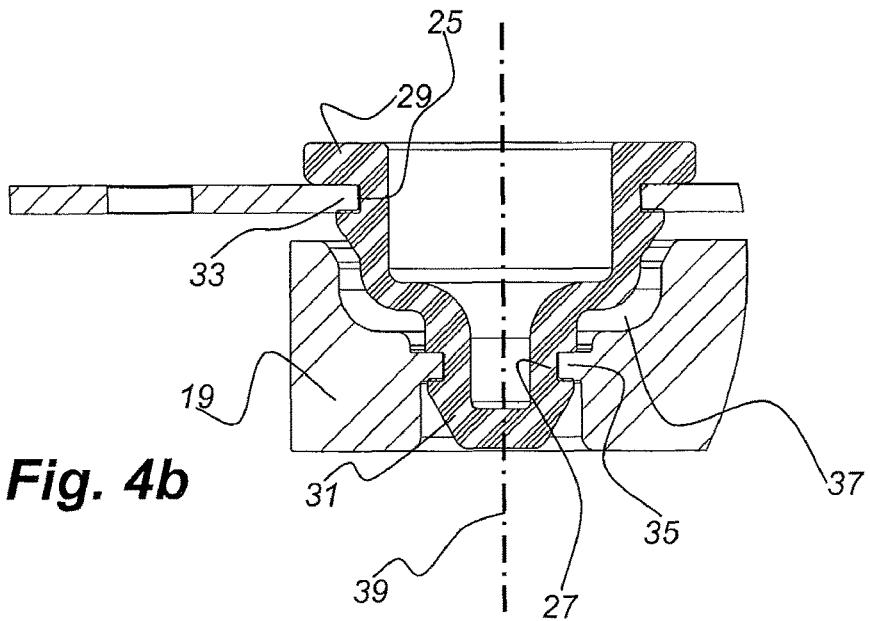

FIGS. 4a and 4b illustrate a cross-section through the damper of FIG. 3, where FIG. 4b shows an enlarged part of FIG. 4a, and FIG. 4a shows the full cross-section along the line A-A in FIG. 3. Generally, as illustrated in FIG. 4b, the elastic element 13 has a wide portion 29 and a narrow portion 31 (the wide portion being wide as compared to the narrow portion and vice-versa). The wide portion 29 is attached to the vibration surface 21 by means of the circumferential groove 25 in the wide portion engaging the rim 33 of the opening (23, see FIG. 2) in the vibration surface 21. In a corresponding manner, the narrow portion 31 is attached to the vibration body 19 by means of the circumferential groove 27 in the narrow portion engaging with a circumferential projection 35, which projects from the wall of a cavity 37 in the vibration body 19. By means of this arrangement, the vibration body 19 is resiliently suspended in relation to the vibration surface 21. The wide and narrow portions 29, 31 are disposed at different locations along a longitudinal axis 39 which is substantially parallel with the normal of the surface 21.

The cavity 37 in the vibration body 19 may be sufficiently large to allow a reasonably great vibration amplitude without coming in direct contact with the wide portion 29 of the elastic element (thereby radically increasing the stiffness). However, it may be useful to let the wide portion come in contact with, and stop the movement of, the vibration body before the vibration body comes into contact with the vibration surface, as strong noise would otherwise be generated. In the illustrated damper the region close to reference sign 37 provides this stopping feature which stops the vibration body from touching the vibration surface.

FIG. 5 illustrates an alternative damper arrangement. In this arrangement, the vibration body 19' is instead attached to the wide portion 29 of the elastic element, and the vibration surface 21' is attached to the narrow portion 31 of the elastic element.

FIG. 6 shows the elastic element of FIG. 4b. As illustrated, the wide portion 29 has a cavity 41. In the illustrated elastic element, the cavity 41 is open towards the wider end, and may thus be used, in the mounting procedure, to receive a tool (not shown) that is used to insert the elastic element into the opening of the vibration surface and into the cavity of the vibration body. The cavity 41 may, but need not, extend into the narrow portion of the elastic element.

The wide 29 and narrow 31 portions are inter-connected by a transition portion 43, which extends circumferentially from the narrow portion and to a great extent radially with respect to the longitudinal axis 39 of the elastic element. In this elastic element, the transition portion has to a great extent the shape of a flat annular disc or ring, centered with the longitudinal axis 39.

The part 45 of the narrow portion that is closest to the transition portion 43 has a smaller radial extension than the portion 47 of the cavity 41 that is closest to the transition portion 43, and therefore fits inside this part of the cavity as seen in the direction of the. axis 39. This allows, as compared to the known device, a relatively low stiffness in the z-dimension, i.e. in the direction parallel to the normal of the vibration surface (cf. FIG. 1). Therefore, the damper can be used to reduce vibrations with comparatively low frequencies in the z-direction. As the dimensions of the relevant part of the narrow portion are smaller than the relevant part of the cavity, the narrow portion can be pushed, at least to some extent, into the cavity, thereby flexing the transition portion 43. It should be noted though, that the narrow portion need not actually enter the cavity during operation of the damper. However, the fact that the narrow portion may be pushed into the cavity provides for a relatively low stiffness in the z-direction.

The elastic element in FIG. 6 is circular symmetric about the longitudinal axis, which implies that the damper will have the same properties in the x-and y-dimensions as illustrated in FIG. 1. In this element, the outer diameter D of the narrow portion 31 close to the transition portion 43 is smaller than the diameter L of the cavity 41 in the wide portion 29, at the portion 47 closest to the transition portion. More particularly, the diameter of the cavity L is about 1.43 times the diameter D of the narrow portion in the illustrated example.

The circular symmetry is advantageous, as the elastic element need not be fixed in any particular orientation around the axis 39 when mounted. However, if different properties in x- and y-dimensions are desired, it is possible e.g. to provide an elastic element which has an elliptic cross-section at some locations along the axis 39. Other shapes are of course also possible.

FIGS. 7a and 7b illustrate an elastic element of a second type, where FIG. 7b illustrates a cross-section along the line A-A in FIG. 7a. In this embodiment, the transition portion 43' has the shape of an envelope surface of a frustum of a cone. This gives a somewhat higher stiffness in the z-dimension and thus makes the damper useful for dampening somewhat higher frequencies than the version of FIG. 6.

The invention is not restricted to the described embodiments and may be altered in different ways within the scope of the appended claims.

The invention claimed is:
1. A dampening system comprising:
    a vibration surface, wherein the vibration surface experiences vibrations normal to the vibration surface;
    a vibration body; and
    at least one elastic element which connects the vibration body to the vibration surface such that the vibration body forms an elastically suspended mass, the elastic element having a wide portion and a narrow portion disposed at different locations along a longitudinal axis which is substantially parallel with a normal of the vibration surface, one of said portions being adapted to attach the elastic element to the vibration body and the other to attach the elastic element to the vibration surface, the wide portion having a cavity, wherein:

the wide and narrow portions are inter-connected by a transition portion, the elastic element and the vibration body are tuned to said vibrations of the vibration surface such that the vibrations normal to the vibration surface are counteracted through phase-shifted movement of the vibration body, and a maximum radial extension of the narrow portion is smaller than a minimum radial extension of the cavity, such that the narrow portion can be pushed at least partly into the cavity of the wide portion, thereby flexing the transition portion.

2. The system according to claim 1, wherein said at least one elastic element is circular symmetric about the longitudinal axis.

3. The system according to claim 1, wherein the transition portion has the shape of an annular disc, centered with respect to the longitudinal axis.

4. The system according to claim 1, wherein the transition portion has the shape of an envelope surface of the frustum of a cone, centered with respect to the longitudinal axis.

5. The system according to claim 1, wherein the cavity is open in the direction of the longitudinal axis at the wide portion.

6. The system according to claim 1, wherein the cavity extends into the narrow portion of the elastic element.

7. The system according to claim 1, wherein the elastic element is made of silicone rubber.

8. The system according to claim 1, wherein the elastic element is attached to the vibration body by means of a first circumferential groove in the elastic element engaging with a circumferential projection inside a cavity of the vibration body.

9. The system according to claim 8, wherein the elastic element comprises a second circumferential groove for attaching the elastic element to the vibration surface.

10. The system according to claim 1, wherein a mass of the vibration body, a stiffness of the elastic element, and a damping of the elastic element are selected to cause the vibration body to be tuned to oscillate at a predetermined target frequency normal to the vibration surface.

11. The system according to claim 1, wherein the vibration surface additionally experiences vibrations parallel to the vibration surface, and wherein the elastic element and the vibration body are tuned to said vibrations of the vibration surface such that the vibrations normal to the vibration surface as well as the vibrations parallel to the vibration surface are counteracted through phase-shifted movement of the vibration body.

12. A method of providing a frequency tuned damper attachable to a vibration surface for damping vibrations normal to the vibration surface, said method comprising:

providing a vibration body; and providing at least one elastic element which is adapted to connect the vibration body to the vibration surface such that the vibration body forms an elastically suspended mass, the elastic element having a wide portion and a narrow portion disposed at different locations along a longitudinal axis which is substantially parallel with the normal of the vibration surface when the damper is mounted, one of said portions being adapted to attach the elastic element to the vibration body and the other to attach the elastic element to the vibration surface, the wide portion having a cavity, wherein:

the wide and narrow portions are inter-connected by a flexible transition portion, the elastic element and the vibration body are tuned to said vibrations such that vibrations normal to the vibration surface are counteracted through phase-shifted movement of the vibration body, and a maximum radial extension of the narrow portion is smaller than a minimum radial extension of the cavity, such that the narrow portion can be pushed at least partly into the cavity of the wide portion, thereby flexing the transition portion.

13. The method according to claim 12, wherein said at least one elastic element is circular symmetric about the longitudinal axis.

14. The method according to claim 12, wherein the transition portion has the shape of an annular disc, centered with respect to the longitudinal axis.

15. The method according to claim 12, wherein the transition portion has the shape of an envelope surface of the frustum of a cone, centered with respect to the longitudinal axis.

16. The method according to claim 12, wherein the cavity is open in the direction of the longitudinal axis at the wide portion.

17. The method according to claim 12, wherein the cavity extends into the narrow portion of the elastic element.

18. The method according to claim 12, wherein the elastic element is made of silicone rubber.

19. The method according to claim 12, wherein the elastic element is attached to the vibration body by means of a first circumferential groove in the elastic element engaging with a circumferential projection inside a cavity of the vibration body.

20. The method according to claim 19, wherein the elastic element comprises a second circumferential groove for attaching the elastic element to the vibration surface.

21. The method according to claim 12, wherein the vibration surface additionally experiences vibrations parallel to the vibration surface, and wherein the elastic element and the vibration body are tuned to said vibrations of the vibration surface such that the vibrations normal to the vibration surface as well as the vibrations parallel to the vibration surface are counteracted through phase-shifted movement of the vibration body.

* * * * *